G. J. DICKSON.
Clamp.
No. 225,000. Patented Mar. 2, 1880.
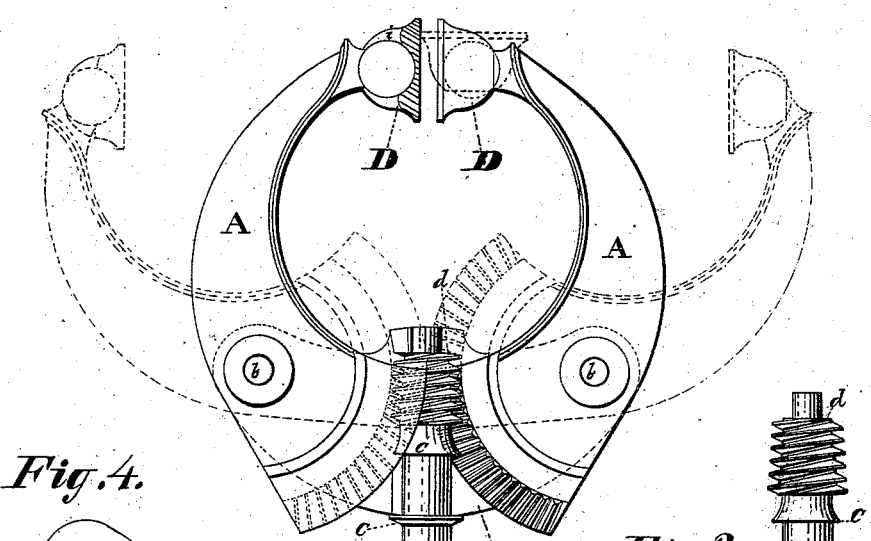
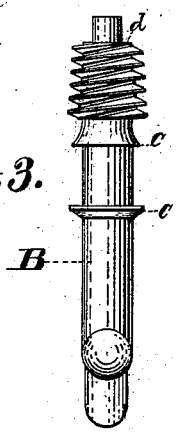
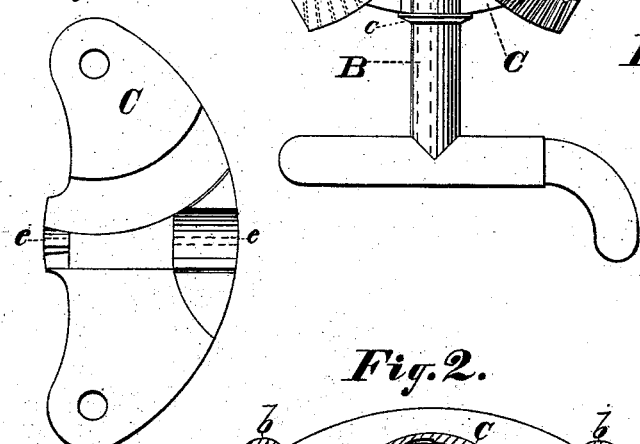
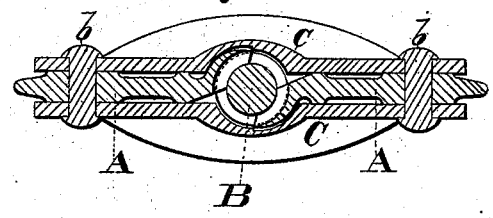
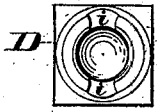
WITNESSES:
Chas. M. Morris,
David E. King.
INVENTOR:
Gilbert J. Dickson

UNITED STATES PATENT OFFICE.

GILBERT J. DICKSON, OF ALBANY, NEW YORK.

CLAMP.

SPECIFICATION forming part of Letters Patent No. 225,000, dated March 2, 1880.

Application filed December 22, 1879.

*To all whom it may concern:*

Be it known that I, GILBERT J. DICKSON, of the city of Albany, in the county of Albany and State of New York, have invented a new and useful Improvement in Clamps, which improvement is fully set forth in the following specification, reference being had to the accompanying drawings, making a part thereof.

The object of my invention is chiefly to obtain a more extensive, rapid, and steady movement of the griping-jaws of a clamp or hand-vise, and also to make the griping-face of said jaws adjustable, so as to conform to the surface of the article being griped, by the combination, in a clamp, of the bowed or lobster-shaped jaws A A, having worm-gearing on the circular portion of their pivoted end, which is in the form of a sector, and the endless screw or wormed shaft B, arranged to operate between the side or bearing plates, C C, as shown in the side view, Figure 1, and cross-sectional view, Fig. 2, of the accompanying drawings.

This invention is illustrated more in detail in the side view, Fig. 1, and cross-sectional view, Fig. 2, Figs. 3, 4, and 5 being detached parts of the same.

The jaws A A are pivoted on the pins or rivets b b, which pass through the bearing-plates C C and the said jaws, holding them together, as shown in Fig. 2. Said jaws taper gradually from the pivot to the griping ends, which are provided with adjustable griping-facets D D, secured to said jaws by means of the ball-joints, as shown in Fig. 1. The sockets of the facets D D, as shown in Figs. 1 and 5, are provided with the slots i i, running outward from said sockets to receive the neck of the said jaws, as shown by dotted lines in Fig. 1, thus allowing said facets a parallel position when the jaws are thrown open to their full extent, as shown by dotted lines in Fig. 1, and also to allow them to turn back so as to form nippers, as shown by dotted lines in the closed position in Fig. 1. Said ball-joint may be ground or packed to prevent the facets from moving of their own weight, causing them to remain in any position in which they are placed until the pressure is brought upon them, when they will conform to the surface of the article being griped, thus preventing said jaws from slipping and marring said surface by giving them a uniform and central bearing. The pivoted end of said jaws forms a sector, or part of a circle, of which the pivot is the center. Said circular end is set off and provided with concaved bevel worm-gearing, which laps partly around the opposite sides of the endless screw or wormed shaft B, as shown in Figs. 1 and 2, thus giving greater strength to the worm and gearing. The said wormed shaft is provided with a T-shaped handle and journaled in the boxes e e formed on the bearing-plates C C, as shown more clearly in Fig. 4, and prevented from lateral movement by the flanges c c and shoulder d on said shaft, as shown more clearly in Fig. 3, and engages with the jaws A A from its opposite sides, as shown in Figs. 1 and 2, and consequently moves said jaws in opposite directions when rotated. Thus, by rotating the shaft to the left the jaws are thrown open, as shown by dotted lines in Fig. 1, and when turned to the right they are closed, as shown by full lines in Fig. 1. In consequence of this double movement of the jaws they open and close rapidly without the direct rotary screw-pressure, as in other clamps, which has a tendency to disarrange the work and mar the article being clamped; and by means of the adjustable jaw faces or facets I am enabled to securely gripe bevels or other uneven surfaces without wedging.

This clamp may also be made to serve the purpose of a jack by reversing the movement of the wormed shaft.

Having thus described my invention, what I claim is—

The bowed or lobster-shaped pivoted jaws A A, having wormed gearing on their circular and pivoted end, in combination with the wormed shaft B and side or bearing plates, C C, for the purpose and substantially as specified.

GILBERT J. DICKSON.

Witnesses:
  CHAS. M. MORRIS,
  DAVID E. KING.